United States Patent [19]

Auracher

[11] Patent Number: 4,714,311
[45] Date of Patent: Dec. 22, 1987

[54] CONTROLLABLE INTEGRATED OPTICAL COMPONENT

[75] Inventor: Franz Auracher, Baierbrunn, Fed. Rep. of Germany

[73] Assignee: Siemens Aktiengesellschaft, Berlin and Munich, Fed. Rep. of Germany

[21] Appl. No.: 631,401

[22] Filed: Jul. 16, 1984

[30] Foreign Application Priority Data

Oct. 14, 1983 [DE] Fed. Rep. of Germany ....... 3337513

[51] Int. Cl.⁴ .............................................. G02B 6/12
[52] U.S. Cl. ............................. 350/96.11; 350/96.13; 350/96.14
[58] Field of Search ............... 350/96.11, 96.12, 96.13, 350/96.14

[56] References Cited

U.S. PATENT DOCUMENTS

| 4,273,411 | 6/1981 | Alferness | 350/96.14 |
| 4,360,246 | 11/1982 | Figueroa et al. | 350/96.12 |
| 4,372,642 | 2/1983 | Singer et al. | 350/96.12 |
| 4,381,139 | 4/1983 | Alferness | 350/96.14 |
| 4,384,760 | 5/1983 | Alferness | 350/96.14 |
| 4,390,236 | 6/1983 | Alferness | 350/96.14 |

FOREIGN PATENT DOCUMENTS 3218626 7/1983 Fed. Rep. of Germany .

OTHER PUBLICATIONS

Kogelnik H., "Switched Directional Couplers with Alternating Δβ", IEEE Journal of Quantum Electronics, vol. QE-12, No. 7, Jul. 1976, pp. 396-401.

Primary Examiner—William L. Sikes
Assistant Examiner—Frank González
Attorney, Agent, or Firm—Hill, Van Santen, Steadman & Simpson

[57] ABSTRACT

A controllable integrated optical component comprises a substrate having electro-optical properties into which optical waveguides are introduced and given which metallizations in the form of a plurality of electrodes which are chargeable with electrical voltages are applied on or next to the optical waveguide. This, a coplanar microwave line is exposed next to the optical waveguides, whereby respectively one electrode is electrically connected to respectively one strip of the microwave line and should also enable a reproducible microwave mode even for microwave frequencies that are as high as possible. The electrodes are disposed between the strips of the microwave line. When the connecting lines between the electrodes and the strips of the microwave line are strip lines, the integrated optical component can be manufactured in planar technology. Fabrication is thereby significantly simplified.

20 Claims, 1 Drawing Figure

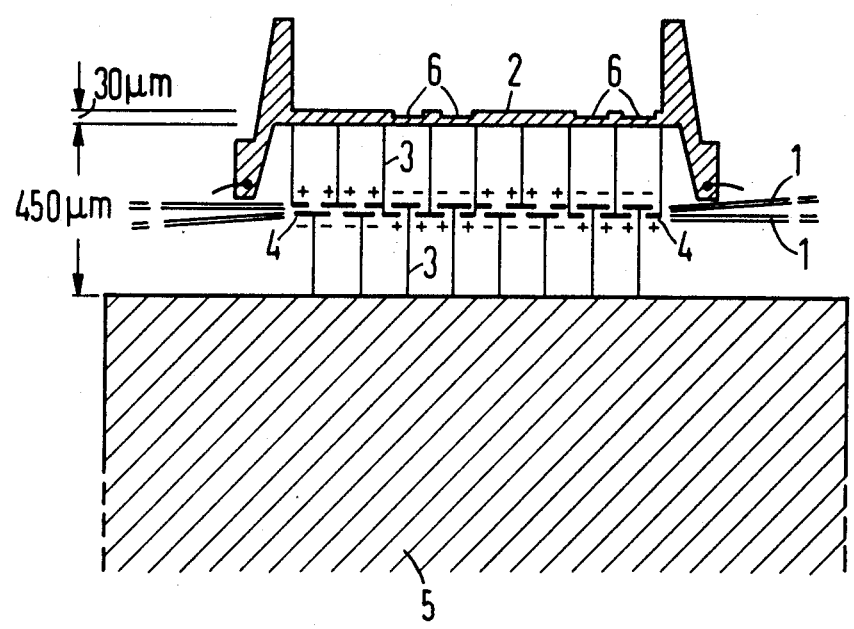

CONTROLLABLE INTEGRATED OPTICAL COMPONENT

BACKGROUND OF THE INVENTION

1. Field of the Invention

The present invention relates to a controllable integrated optical component comprising a substrate having electro-optical properties into which at least one optical waveguide is introduced and wherein metallizations in the form of a plurality of electrodes which are chargeable with electrical voltages are applied on or next to at least one optical waveguide.

2. Description of the Prior Art

Controllable integrated optical components such as, for example, directional couplers or Mach-Zehnder interferometers are employed as switches or modulators. An electrical field is used for the modulation of light given electro-optical components. In the simplest arrangement, the phase modulator, the refractive index is altered with the assistance of the electrical field and the propagation constant $\beta$ and, therefore, the phase relation of the light are modulated as a result thereof. The intensity of the light can be modulated in various ways with corresponding electrode and waveguide arrangements. An electrical field can, for example, be employed to control a reflecting layer such that light is partially or completely reflected. Further, the refractive index of a waveguide can be lowered to such a degree with an electrical field that the intensity of the guided light beam is partially or entirely coupled over into substrate modes. The controllable directional coupler which comprises coupled waveguides is one of the most important electro-optical components. The intensity modulation or, respectively, transfer of the light to one of the output waveguides is thereby based on the electrical detuning of the coupled waveguides. The detuning occurs by way of an opposing variation of the refractive index in the coupled waveguides. An improvement of the modulation depth or, respectively, of the crosstalk attenuation is possible with a modified directional coupler in the manner of the alternating delta-beta principle, as has been disclosed in the article of H. Kogelnik and R. V. Schmidt in the periodical IEEE J. Quantum Electronics, Vol. 1976, QE-12, pp. 396–401. The electrodes of the directional coupler are thereby divdided into individual sections and are driven with alternating modulation voltage. Given the intensity modulator according to the Mach-Zehnder principle, the incoming, guided light energy is uniformly divided onto two waveguides. The resulting waves in these two waveguides are then electro-optically phase modulated in different manners. Intensity-modulated light arises at the output of the Mach-Zehnder interferometer due to interference after the combination of these two waves.

The German Letters Patent No. 32 18 626, fully incorporated herein by this reference, discloses a controllable integrated optical component in which metallizations in the form of a plurality of electrodes are applied on or next to the optical waveguide, the electrodes being chargeable with electric voltages, whereby a coplanar microwave line is disposed next to the optical waveguides, and whereby respectively one electrode is connected to a respective strip of the microwave line via a line which is as short as possible. Given such a controllable integrated optical component, the advantages of a traveling wave line, namely a fundamentally attainable, high modulation bandwidth, are combined with the advantages of concentrated electrode sections, namely a flexible selection of the voltage polarity at the electrodes. In that the radio frequency line in this known integrated optical component is no longer bound to the dimensions of the optical waveguides, this radio frequency line can have rather large cross-sectional dimensions. A very low series resistance of the radio frequency line derives in this manner. An alternating voltage polarity can be supplied to the electrodes and, therefore, an alternating electrical field can be supplied to the optical waveguides without difficulty in that the electrode sections can be connected to the radio frequency line in this known integrated optical component by way of short bond connection. In this manner, for example, the advantageous alternating delta-beta principles can be connected with the advantages of a broadband traveling wave line. In that the radio frequency line is disposed next to the optical waveguides, given this known integrated optical component, the radio frequency line can be applied without difficulty to a different dielectric material with which the optical substrate can be laterally coated or which is separately disposed next to the optical waveguides. When the radio frequency line is applied, for example, to ceramic or, even better, to silica glass and the electrodes are located on lithium niobate, such a phase velocity can be created for the controlling radio frequency wave in this manner at the optical wave in the optical waveguides in lithium niobate and the controlling wave on the radio frequency line approach one another with respect to their phase velocities. The manufacture of the bonded connections between the individual electrodes and the respective strip of the microwave line is involved, given this known integrated optical component. With such a known integrated optical component, the long bonded connections have relatively high inductances, the frequency response in this known integrated optical component being deteriorated as a result thereof. Moreover, these bonded connections are of different lengths, this again resulting in inductances of different magnitudes. These differing inductances, however, hardly allow a reproducible microwave mode of such a known integrated optical component.

SUMMARY OF THE INVENTION

The object of the present invention is to provide a controllable integrated optical component of the type initially set forth which enables a reproducible microwave mode.

The above object is achieved, according to the present invention, in a controllable integrated optical component which is characterized in that the electrodes are disposed between the strips of the microwave line.

At least some of the lines between electrodes and strips of the microwave line can be practically cut in half in terms of line length in comparison to the known integrated optical component in that the electrodes of the integrated optical component of the present invention are disposed between the strips of the microwave line. A significant improvement over the known integrated optical component is therewith already achieved in view of the reproducibility given the microwave mode. An embodiment wherein the electrodes practically lie in the middle between two strips of the microwave line is particularly advantageous. Then, in particular, the lines between the individual electrodes and the respective strips of the microwave line are practically equal in length.

The improvements set forth above can also be achieved with bonded connections. In order, however, to simplify the manufacturing process and the reproducibility of the rf-performance of an integrated optical component constructed in accordance with the present invention, the lines between the electrodes and the strips of the microwave line can be designed as strip lines. In this case, only a single masking step is required in the manufacture of the integrated optical component. Since no additional bond connections are required, the manufacture of such an integrated optical component is considerably more simple in terms of production engineering. Further, in an area of at least 50 $\mu$m $\times$ 50 $\mu$m is required for the manufacture of a bonded connection because, of course, the bonded wire should be as low-resistant as possible. Each such bonded connection, however, has an additional capacitance which causes an additional reflection of the microwave and which therefore disturb the operation of an integrated optical component.

The electrode elements form a capacitance between the waveguides. This capacitance is already taken into consideration in the known integrated optical component. A capacitance, however, is also formed between the strip of the microwave line and an intermediately adjacent electrode that has a different potential than the strip of the microwave line, this capacitance not having been taken into consideration in the design of the known integrated optical component and causing a deterioration of the frequency response. Different capacitances between electrode elements and strips of the microwave line can thus be compensated according to the present invention when at least one of the two strips of the microwave lines has a different width in the running direction of the microwave. Such a variation of the width of the stip of the microwave line is particularly meaningful when this strip of the microwave line has a relatively low resistance.

Integrated optical components constructed in accordance with the present invention particularly lend themselves for picosecond switching modes, picosecond modulator modes and picosecond logic modes.

BRIEF DESCRITPTION OF THE DRAWING

Other objects, features and advantages of the invention, its organization, construction and operation will be best understood from the following detailed description, taken in conjunction with the accompanying drawing, on which there is a single FIGURE showing, in schematic form, a very fast directional coupler-modulator operating in accordance with the alternating delta-beta principle and in accordance with the present invention.

DESCRIPTION OF THE PREFERRED EMBODIMENTS

Referring to the drawing, a very fast directional coupler-modulator, operating in accordance with the alternating delta-beta principle, and having low insertion losses for an optical wave length 1.3 $\mu$m in lithium niobate is illustrated. A data rate of at least 6 GHz/sec can be transmitted with such a directional coupler-modulator, constructed in accordance with the invention, given an insertion loss of 2 dB. Such a directional coupler-modulator permits a simple and reproducible manufacture.

The planar directional coupler-modulator according to the drawing comprises a complanar microwave line having a characteristic impedance of 75$\Omega$. The microwave line comprises two strips 2 and 5. The strip 5 is connected to ground potential. The strip 2 has the potential curve of the microwave. The control electrodes 4 are disposed in the middle between the strips 2 and 5 of the microwave line. The strip line 3 between the control electrodes 4 and the strips 2 and 5 are of about equal length and can be produced in planar technology.

Due to the loading of the microwave line with the discrete electrodes 4 which are located on the optical waveguide 1, and are connected to the strips 2 and 5 of the microwave line by way of strip lines, the characteristic impedance of the overall line is reduced such that a combined resistance of about 50$\Omega$ occurs. It should thereby be noted that the spacing between the individual electrode sections 4 along the microwave line must remain small in comparison to the wave length of the microwave. When the characteristic impedance ZO is the impedance of the coplanar microwave line without load, and the capacitance CO is its distributed capacitance then the effective characteristic impedance Z1 of the loaded line is $$Z1 = ZO/\sqrt{1 + CE/CO}$$

where CE is the distributed capacitance of the electrode elements 4. The delay time T1 characteristic of the phase velocity of the microwave along the loaded microwave line thereby derives at $$T1 = TO \cdot \sqrt{1 + CE/CO}$$

where TO is the delay time of the unloaded microwave line and CE and CO are the aforementioned distributed capacitances.

The optical waveguides 1 can be generated in that 6 $\mu$m wide titanium strips having a thickness of 70 nm diffused into the lithium niobate substrate for ten hours in a humid oxygen atmosphere at 1050° C. These parameters for the manufacture of the optical waveguides 1 guarantee very low insertion losses when the optical waveguides 1 are coupled to monomode fibers at one end. The spacing between the two titanium strips for the manufacture of the optical waveguides 1 amounts, for example, to 6 $\mu$m, this resulting in a simple coupling length of 2.7 mm given the integrated optical component of the present invention. The light from one of the optical waveguides 1 can be completely coupled over to the other of the two optical waveguides 1 within a simple coupling length. The length of the directional coupler-modulator amounts, for example, to 10 mm. A 0.3 $\mu$m thick silicon dioxide intermediate layer is disposed between the optical waveguides 1 and the electrode elements 4. This intermediate layer can be applied at 400° C. from a plasma with the assistance of a chemical vapor deposition. The electrode elements 4 consist, for example, of 1.6 $\mu$m thick aluminum and can be structured with the assistance of a reactive ion etching process. The finished directional coupler-modulator can be connected to monomode fibers via butt joints. The microwave conductor structure is usually terminated with a 50$\Omega$ resistor. The measured optical insertion losses amount to 2 dB, the operating voltage at low microwave frequencies amounts to about 16 V for 100% modulation or 9.5 V for 10–90% modulation. The directional coupler-midulator according to the drawing was designed for a bandwidth of 4.2 GHz considering transit time effects and the frequency-dependent attenuation of the electrodes. The speed of the modulator was tested with a fast electrical pulse generator (100 ps rise time) and a fast indium-gallium-arsenide/indium-phosphide PIN photodiode (60 . . . 80 ps rise time) as a detector. The measured rise time of the detected optical pulse amounted to 135 ps. The modulated signal therefore has a rise time of less than 70 ps. The shortest electrical pulse (half-width value of 140 ps) resulted in a detected optical pulse having a half-width value of 160 ps.

The spacing between the strip 2 and the strip 5 amounts to 450 $\mu$m. The strip 2 has a width of 30 $\mu$m. This strip 2 has indentations at those locations 6 at which electrode elements 4 which have a different potential than the strip 2 are immediately adjacent to the strip 2. Capacitances which are compensated by way of these indentations at the location 6 are formed during the microwave mode between the location 6 and the immediately adjacent electrode elements 4. The electrode elements 4 are disposed such that the electrical connection between each local region of each electrode element 4 to the appertaining strip 2 or, respectively, strip 5 of the microwave line is of practically the same length. Additional inductances could additionally derive from the expansion of the individual electrode elements 4 are avoided in this manner. As viewed in terms of electrical effects, therefore, the electrode elements 4 lying side-by-side which respectively cover one of the optical waveguides 1 belong together. Based on electrical functions, therefore, there are a total of eight electrodes which together cover the two optical waveguides 1. These eight electrodes (eight as viewed in terms of electrical function) are alternately connected to the coplanar line. The cutoff frequency of the modulator constructed in accordance with the invention exceeds 6 GHz.

Although I have disclosed my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A controllable integrated optical component, comprising:
    a conductive first strip of a microwave line including a substrate having electro-optical property;
    a conductive second strip of the microwave line disposed spaced from and generally parallel to said substrate;
    at least one optical waveguide in said substrate between said first and second strips; and
    a plurality of electrodes which may be charged with alternate electrical potentials disposed between said first and second strips, each of said electrodes connected to a respective strip.

2. The controllable integrated optical component of claim 1, and further comprising:
    a plurality of conductors of substantially the same length connecting said electrodes to the respective conductive strips.

3. The controllable integrated optical component of claim 2, wherein:
    each of said conductors is a strip line.

4. The controllable integrated optical component of claim 1, wherein:
    said electrodes are divided and disposed in two rows; and
    a plurality of electrical connections of substantially the same length is provided, said electrical connections respectively connecting the individual electrodes to the respective strip of the microwave line.

5. The controllable integrated optical component of claim 1, wherein:
    said substrate comprises lithium-niobate; and
    said optical waveguide comprises titanium.

6. The controllable integrated optical component of claim 5, and further comprising:
    a layer of silicon dioxide between said optical waveguide and said electrodes.

7. The controllable integrated optical component of claim 6, wherein:
    said electrodes comprise aluminum.

8. The controllable integrated optical component of claim 7, wherein:
    said optical waveguide comprises a thickness of 70 nm;
    said silicon dioxide layer comprises a thickness of 0.3 $\mu$m; and
    each of said electrodes comprises a thickness of 1.6 $\mu$m.

9. A controllable integrated optical component, comprising:
    a microwave line including a substrate having electro-optical properties as a first strip, and a conductive second strip spaced from and generally parallel to said first strip;
    a pair of optical waveguides disposed spaced apart in said substrate between said first and second strips; and
    a plurality of spaced apart electrodes carried between said first and second strips over said pair of waveguides and electrically connected to respective ones of said first and second strips for receiving alternate polarity signals.

10. The controllable integrated optical component, of claim 9, wherein:
    said substrate comprises lithium niobate.

11. The controllable integrated optical component, of claim 10, wherein:
    said optical waveguides each comprise titanium.

12. The controllable integrated optical component, of claim 11, wherein:
    said optical waveguides each comprise a thickness of 70 nm.

13. The controllable integrated optical component of claim 12, wherein:
    said optical waveguides are spaced apart 6 $\mu$m.

14. The controllable integrated optical component of claim 10, and further comprising:
    an intermediate layer of silicon dioxide between said optical waveguides and said electrodes.

15. The controllable integrated optical component of claim 14, wherein:
    said layer of silicon dioxide comprises a thickness of 0.3 $\mu$m.

16. The controllable integrated optical component of claim 14, wherein:
    each of said electrodes comprises aluminum.

17. The controllable integrated optical component of claim 16, wherein:
each of said electrodes comprises a thickness of 1.6 μm.

18. A controllable integrated optical component, comprising:
a microwave line including a substrate comprising lithium niobate as a first strip and a conductive second strip extending generally parallel to and spaced from said substrate;
a pair of optical waveguides spaced apart 6 μm in said substrate between said conductive strips, each of said waveguides extending into said substrate 70 nm and each comprising titanium;
an intermediate layer, comprising silicon dioxide, over said pair of optical waveguides and comprising a thickness of 0.3 μm;
a plurality of spaced apart electrodes carried in a side-by-side arrangement on said intermediate layer and each comprising aluminum and a thickness of 1.6 μm; and
a plurality of strip lines of substantially the same length electrically connecting said electrodes to respective ones of said first and second strips of said microwave line.

19. A controllable integrated optical component, comprising:
a conductive first strip of a microwave line including a substrate having electro-optical properties;
a conductive second strip of the microwave line disposed spaced from and generally parallel to said substrate;
at least one optical waveguide in said substrate between said first and second strips; and
a plurality of electrodes which may be charged with alternate electrical potentials disposed between said first and second strips, each of said electrodes connected to a respective strip,
at least one of said first and second strips comprising sections of different widths along its length to compensate different capacitances between said electrodes and said first and second strips.

20. A controllable integrated optical component, comprising:
a conductive first strip of a microwave line including a substrate having electro-optical properties;
a conductive second strip of the microwave line disposed spaced from and generally parallel to said substrate;
at least one optical waveguide in said substrate between said first and second strips; and
a plurality of electrodes which may be charged with alternate electrical potentials disposed between said first and second strips, each of said electrodes connected to a respective strip,
said second strip comprising sections of different widths along a length to compensate different capacitances between said electrodes and said first and second strips.

* * * * *